(12) United States Patent
Jeong et al.

(10) Patent No.: US 11,685,692 B2
(45) Date of Patent: Jun. 27, 2023

(54) COMPOSITION FOR MANUFACTURING ARTIFICIAL MARBLE

(71) Applicant: WAPS CO., LTD, Busan (KR)

(72) Inventors: Semin Jeong, Busan (KR); Sanghoon Ha, Busan (KR)

(73) Assignee: WAPS CO., LTD, Busan (KR)

( * ) Notice: Subject to any disclaimer, the term of this patent is extended or adjusted under 35 U.S.C. 154(b) by 576 days.

(21) Appl. No.: 16/608,156

(22) PCT Filed: Oct. 22, 2019

(86) PCT No.: PCT/KR2019/013883
§ 371 (c)(1),
(2) Date: Oct. 24, 2019

(87) PCT Pub. No.: WO2021/071003
PCT Pub. Date: Apr. 15, 2021

(65) Prior Publication Data
US 2021/0331976 A1 Oct. 28, 2021

(30) Foreign Application Priority Data
Oct. 7, 2019 (KR) .......................... 10-2019-0124111

(51) Int. Cl.
*C04B 26/06* (2006.01)
*C04B 14/30* (2006.01)
(Continued)

(52) U.S. Cl.
CPC ............ *C04B 26/06* (2013.01); *C04B 14/303* (2013.01); *C04B 24/04* (2013.01);
(Continued)

(58) Field of Classification Search
CPC ....... C04B 26/06; C04B 14/303; C04B 24/04; C04B 24/2641; C04B 2103/10; C04B 2103/445; C04B 2103/54; C04B 2111/545
See application file for complete search history.

(56) References Cited

U.S. PATENT DOCUMENTS 6,191,229 B1 * 2/2001 Sasabe ...................... C08F 8/46
525/262
6,316,548 B1 * 11/2001 Koyanagi ............... C04B 26/06
526/230.5
(Continued)

FOREIGN PATENT DOCUMENTS

EP 1146023 A1 * 10/2001 ............. C04B 16/04
JP H0532720 A 2/1993
(Continued)

OTHER PUBLICATIONS

Office Action from copending Kiorean Application No. KR10-2019-0124111, dated Mar. 22, 2021.
(Continued)

*Primary Examiner* — John E Uselding
(74) *Attorney, Agent, or Firm* — Bridgeway IP Law Group, PLLC; Hyun Woo Shin

(57) ABSTRACT

The present invention relates to a composition for manufacturing artificial marble including a first preliminary composition and a second preliminary composition which include an acrylic-based monomer, an acrylic-based resin, a polymerization initiator, a crosslinking agent, a coloring agent, and a gelling agent and have a viscosity of 100,000 Ps to 5,000,000 Ps and/or a storage modulus of 100,000 Pa to 1,000,000 Pa. A viscosity of the second preliminary composition is higher than a viscosity of the first preliminary composition. Coloring agents of the first preliminary composition and the second preliminary composition have different colors. A weight ratio of the first preliminary com-
(Continued)

position to the second preliminary composition is in a range of 1:1 to 500:1. According to the present invention, artificial marble having a dashed pattern similar to that of natural marble is provided by increasing viscoelasticity to prepare semi-solid preliminary compositions for manufacturing artificial marble, having excellent workability and machinability, preparing a composition for manufacturing artificial marble by mixing two or more of the semi-solid preliminary compositions, and performing various molding and machining processes on the composition.

18 Claims, 2 Drawing Sheets

(51) Int. Cl.
    *C04B 24/04*     (2006.01)
    *C04B 24/26*     (2006.01)
    *C04B 103/10*     (2006.01)
    *C04B 103/44*     (2006.01)
    *C04B 103/54*     (2006.01)
    *C04B 111/54*     (2006.01)

(52) U.S. Cl.
    CPC ...... *C04B 24/2641* (2013.01); *C04B 2103/10* (2013.01); *C04B 2103/445* (2013.01); *C04B 2103/54* (2013.01); *C04B 2111/545* (2013.01)

(56) References Cited

U.S. PATENT DOCUMENTS

| | | | | |
|---|---|---|---|---|
| 6,323,259 | B1* | 11/2001 | Ikegami | C08F 285/00 523/201 |
| 6,451,910 | B1* | 9/2002 | Koyanagi | C04B 26/06 524/425 |
| 2002/0173589 | A1* | 11/2002 | Kawabata | C08F 279/02 525/63 |
| 2006/0267230 | A1* | 11/2006 | Rha | C04B 26/06 264/39 |
| 2008/0153964 | A1* | 6/2008 | Park | C04B 26/06 524/425 |
| 2011/0178228 | A1* | 7/2011 | Kim | C08F 265/06 525/330.3 |

FOREIGN PATENT DOCUMENTS

| | | |
|---|---|---|
| KR | 10-2000-0005550 | 1/2000 |
| KR | 10-2010-0029503 | 3/2010 |
| KR | 10-2010-0106756 A | 10/2010 |
| KR | 10-2011-0106011 | 9/2011 |
| KR | 10-2017-0064579 | 6/2017 |

OTHER PUBLICATIONS

International Search Report for Application No. PCT/KR2019/013883 dated Jul. 7, 2020 and the English translation of the Table in p. 2 of the International Search Report.

* cited by examiner

[Fig. 1]
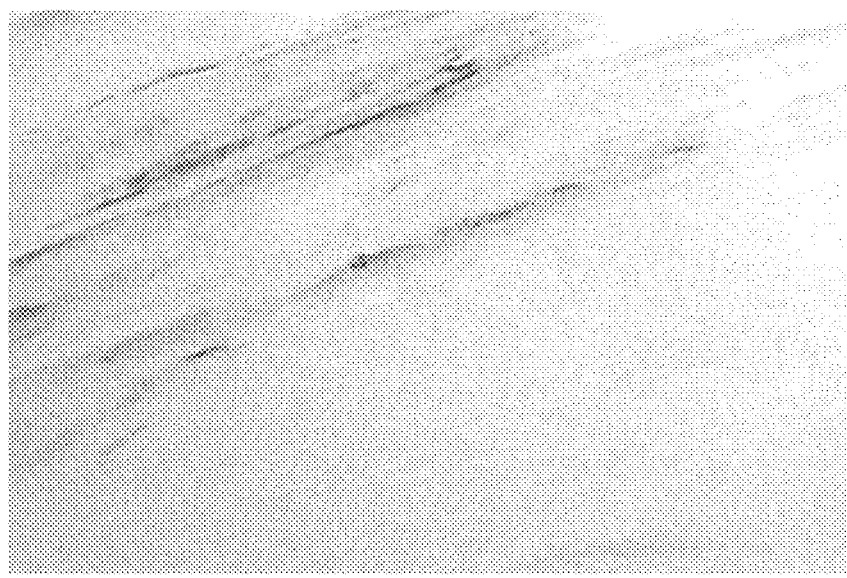
[Fig. 2]
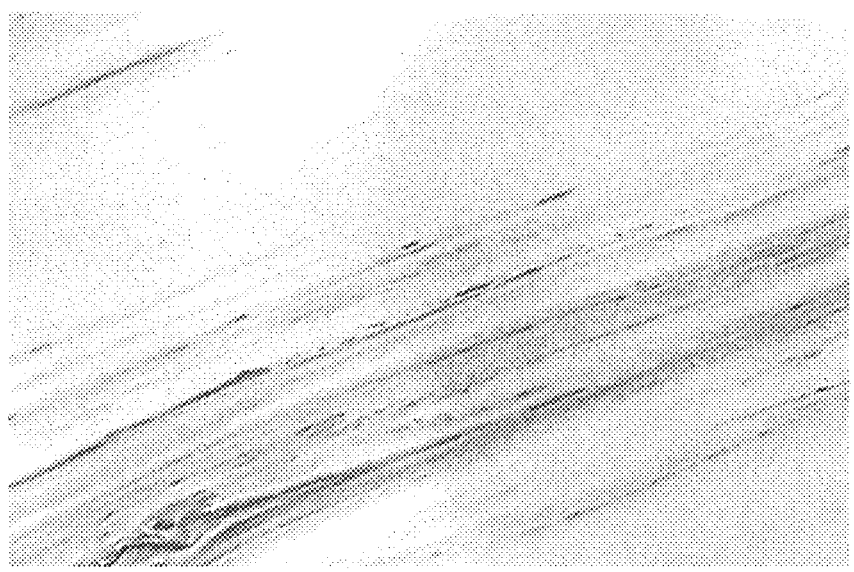

[Fig. 3]
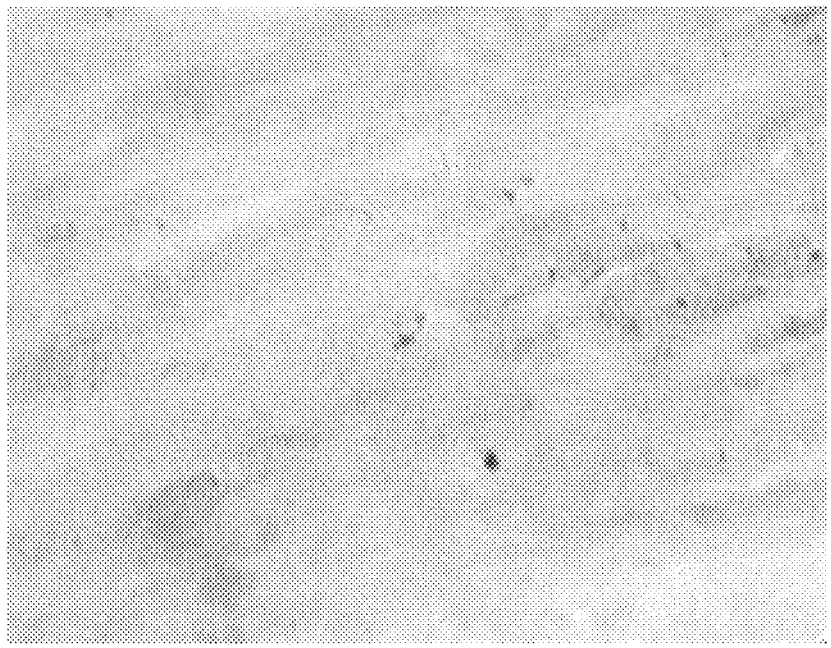

US 11,685,692 B2

COMPOSITION FOR MANUFACTURING ARTIFICIAL MARBLE

CROSS REFERENCE TO RELATED APPLICATIONS

This application is a U.S. National Phase Application under 35 U.S.C. 371 of International Application No. PCT/KR2019/013883 filed on Oct. 22, 2019. This application claims priority to Korean Application No. 10-2019-0124111 filed on Oct. 7, 2019. The entire disclosures of all of the above applications are incorporated herein by reference.

TECHNICAL FIELD

The present invention relates to a composition for manufacturing artificial marble and a preliminary composition for preparing the same.

BACKGROUND ART

Recently, since artificial marble, which is widely used as building interior materials, has excellent performances such as an excellent texture, an elegant exterior, easy machinability, excellent weatherproof, and high strength, the artificial marble has been used as interior materials for various purposes, such as a table upper plate, a sink upper plate, a washstand, furniture, a flooring material, and a wall material.

Such artificial marble is an artificial composite in which additives such as a natural stone powder, a mineral, and/or a resin chip are mixed into a base such as synthetic resins such as an acrylic resin, an unsaturated polyester resin, and an epoxy resin, or cement, and an additive such as a pigment is added to the resultant mixture as necessary to implement a texture of natural stone.

Representative types of the artificial marble include acrylic-based artificial marble, polyester-based artificial marble, epoxy-based artificial marble, melamine-based artificial marble, and engineered stone (E-stone)-based artificial marble. Among the marbles, the acrylic-based artificial marble is used for various purposes due to advantages in transparency and a luxurious texture of a resin itself.

However, in the past, there has been a limitation in implementing a pattern similar to that of natural marble. Moreover, since compositions of the existing artificial marble are mostly prepared in a liquid state or a slurry state having high viscosity by performing a casting process or a press process, the compositions are difficult to handle, and machinability and workability are significantly reduced due to the difficulty in handling. As a result, it is difficult to implement a natural pattern.

Accordingly, in order to solve the above problems, the present inventors have prepared a semi-solid preliminary composition having excellent workability and machinability by increasing the viscoelasticity of a preliminary composition constituting a composition for manufacturing artificial marble and have prepared the composition for manufacturing the artificial marble including the semi-solid preliminary composition. Thus, the present inventors have confirmed that a dashed pattern having a texture similar to that of natural marble is implementable through various molding and machining processes, thereby completing the present invention.

DISCLOSURE

Technical Problem

The present invention is directed to providing a composition for manufacturing artificial marble which very realistically implements a dashed pattern having a texture similar to that of natural marble, implements a pattern, and is easily molded, and a preliminary composition for preparing the same.

Technical Solution

In an embodiment of the present invention, provided is a preliminary composition for manufacturing artificial marble, including an acrylic-based monomer, an acrylic-based resin, a polymerization initiator, a crosslinking agent, a coloring agent, and a gelling agent and having a viscosity of 100,000 Ps to 5,000,000 Ps, a storage modulus of 100,000 Pa to 1,000,000 Pa, or the viscosity in the range and the storage modulus in the range.

In another embodiment of the present invention, provided is a composition for manufacturing artificial marble including a first preliminary composition and a second preliminary composition which are the above-described preliminary composition, wherein a viscosity of the second preliminary composition is higher than a viscosity of the first preliminary composition, coloring agents of the first preliminary composition and the second preliminary composition have different colors, and a weight ratio of the first preliminary composition to the second preliminary composition is in a range of 1:1 to 500:1.

Furthermore, in still another embodiment of the present invention, provided is artificial marble manufactured using the composition for manufacturing the artificial marble.

Advantageous Effects

Since a composition for manufacturing artificial marble of the present invention includes a preliminary composition having high viscoelasticity in a semi-solid state, the composition for manufacturing the artificial marble is easier to handle as compared with most existing compositions for manufacturing artificial marble, which are prepared in a liquid state. Accordingly, the composition for manufacturing the artificial marble has excellent workability and machinability.

A composition for manufacturing artificial marble of the present invention can be applied to various molding and machining methods, can express a texture similar to that of natural marble, and in particular, can implement a dashed pattern.

DESCRIPTION OF DRAWINGS

FIGS. 1 and 2 show surfaces of artificial marbles manufactured according to Examples of the present invention.
FIG. 3 shows a surface of artificial marble manufactured according to Comparative Example of the present invention.

BEST MODE OF THE INVENTION

The present invention relates to a composition for manufacturing artificial marble and a preliminary composition for preparing the same, and more specifically, a composition for manufacturing artificial marble in which viscoelasticity of a composition is increased to prepare semi-solid preliminary compositions for manufacturing artificial marble, having excellent workability and machinability, a composition for manufacturing artificial marble is prepared to include the two or more preliminary compositions for manufacturing the artificial marble, and various molding and machining processes are performed on the composition for manufacturing the artificial marble to implement a pattern having a texture similar to that of natural marble, and a preliminary composition for preparing the same.

In particular, when a composition for manufacturing artificial marble of the present invention is used, it is possible to implement a wave pattern, a spread pattern, a granite pattern, and a dashed pattern, in particular, the dashed pattern, thereby expressing a texture very similar to that of natural marble.

A preliminary composition for manufacturing artificial marble according to the present invention includes an acrylic-based monomer, an acrylic-based resin, a polymerization initiator, a crosslinking agent, a coloring agent, and a gelling agent. The preliminary composition has a viscosity of 100,000 Ps to 5,000,000 Ps, has a storage modulus of 100,000 Pa to 1,000,000 Pa, or has a viscosity of 100,000 Ps to 5,000,000 Ps and a storage modulus of 100,000 Pa to 1,000,000 Pa.

Modes of the Invention

Hereinafter, a composition for manufacturing artificial marble capable of implementing a natural marble pattern and a preliminary composition for manufacturing artificial marble, which is for preparing the same according to the present invention will be described in more detail with reference to embodiments and Examples. Meanwhile, the following embodiments and Examples are provided as a reference for explaining the present invention in detail, and therefore, the present invention is not limited thereto, but may be implemented in various ways.

Unless defined otherwise, all technical and scientific terms used herein have the same meanings generally understood by those skilled in the art to which the present invention pertains, and terms used in the detailed description of the present invention effectively describe specific embodiments, and are not intended to limit the present invention.

As used herein, the term "viscoelasticity" means a property including both viscosity and elasticity.

As used herein, the term "viscosity" is a physical unit that indicates a degree of viscousness in a flow of a fluid and refers to internal resistance when a fluid flows. The viscosity is also referred to as another term such as dynamic viscosity or absolute viscosity with the same meaning.

As used herein, the term "complex viscosity" means a frequency-dependent viscosity function determined during forced small amplitude harmonic oscillation of shear stress, in units of Pascal-seconds, that is equal to the difference between dynamic viscosity and out-of-phase viscosity (imaginary part of complex viscosity). In other words, the complex viscosity refers to a dynamic viscoelastic characteristic by a sine wave oscillation method under an oscillation frequency of 1 rad/sec. For example, the complex viscosity is measured in such a manner that a material to be measured is set is set on parallel plates, a normal force is set to zero, sine wave oscillation is applied thereto at an oscillation frequency of 1 rad/sec, and then, the complex viscosity is measured at a certain temperature.

As used herein, the term "storage modulus" is a numerical value representing elasticity, which means resistance to deformation. That is, the storage modulus in a viscoelastic material means measured storage energy, which refers to an elastic portion of the material.

As used herein, the term "preliminary composition for manufacturing artificial marble" or "preliminary composition" means a composition prepared in advance for preparing "composition for manufacturing artificial marble".

As used herein, the term "composition for preparing artificial marble" includes two or more different compositions for manufacturing artificial marble. The "composition for manufacturing the artificial marble" includes two or more compositions for manufacturing artificial marble". In this case, the included two or more preliminary compositions for manufacturing the artificial marble are present in a state of not being uniformly mixed. In an example, the two or more preliminary compositions for manufacturing the artificial marble are in a state of being combined by an external force through extruding.

The present invention relates to a composition for manufacturing artificial marble and a preliminary composition for preparing the same, and more specifically, a composition for manufacturing artificial marble in which viscoelasticity of a composition is increased to prepare semi-solid preliminary compositions for manufacturing artificial marble, having excellent workability and machinability, a composition for manufacturing artificial marble is prepared to include the two or more preliminary compositions for manufacturing the artificial marble, and various molding and machining processes are performed on the composition for manufacturing the artificial marble to implement a pattern having a texture similar to that of natural marble, and a preliminary composition for preparing the same.

In particular, when a composition for manufacturing artificial marble of the present invention is used, it is possible to implement a wave pattern, a spread pattern, a granite pattern, and a dashed pattern, in particular, the dashed pattern, thereby expressing a texture very similar to that of natural marble.

A preliminary composition for manufacturing artificial marble according to the present invention includes an acrylic-based monomer, an acrylic-based resin, a polymerization initiator, a crosslinking agent, a coloring agent, and a gelling agent. The preliminary composition has a viscosity of 100,000 Ps to 5,000,000 Ps, has a storage modulus of 100,000 Pa to 1,000,000 Pa, or has a viscosity of 100,000 Ps to 5,000,000 Ps and a storage modulus of 100,000 Pa to 1,000,000 Pa.

The composition for manufacturing the artificial marble according to the present invention may include one or more different preliminary compositions for manufacturing artificial marble.

In one embodiment, the composition for manufacturing the artificial marble according to the present invention may include one or more preliminary compositions for manufacturing artificial marble, which have viscosity and/or coloring agents having different colors.

In one embodiment, the composition for preparing the artificial marble according to the present invention may include a first preliminary composition for manufacturing the artificial marble and a second preliminary composition for manufacturing the artificial marble. In this case, viscosity of the second preliminary composition may be higher than viscosity of the first preliminary composition. Coloring agents of the first preliminary composition and the second preliminary composition may have different colors, and a weight ratio of the first preliminary composition to the second preliminary composition may be in a range of 1:1 to 500:1.

In one embodiment, the composition for manufacturing the artificial marble according to the present invention may additionally include one or more preliminary compositions for manufacturing the artificial marble in addition to the first preliminary composition for manufacturing the artificial marble and the second preliminary composition for manufacturing the artificial marble.

In this case, the additionally included one or more preliminary compositions for manufacturing the artificial marble differ from the first preliminary composition and/or the second preliminary composition in any one of viscosity and a coloring agent.

An existing composition for manufacturing artificial marble is in a liquid slurry state and has a viscosity of about 10,000 Ps to 100,000 Ps and/or a storage modulus of 1,000 Pa to 100,000 Pa. However, in this case, since a casting process or press process is performed in the slurry state, the composition is difficult to handle, and thus, machinability and workability are significantly reduced. As a result, it is difficult to implement a dashed pattern similar to that of natural marble.

In particular, when a composition for manufacturing artificial marble, which has a viscosity less than 100,000 Ps, is used, due to a flow of the composition itself, it is difficult to adjust a pattern to be implemented, that is, the direction and thickness of the pattern. When a composition for manufacturing artificial marble, which has a viscosity exceeding 5,000,000 Ps, moldability is lowered during press-molding.

In one embodiment of the present invention, the composition for manufacturing the artificial marble may be prepared by concurrently extruding and combining the first preliminary composition and the second preliminary composition. After the first and second preliminary compositions are prepared, the first and second preliminary compositions may be repeatedly and sequentially introduced into an extruder, and suitable amounts of the first and second preliminary compositions may be mixed to prepare the composition for manufacturing the artificial marble.

The first preliminary composition and the second preliminary composition each include an acrylic-based monomer, an acrylic-based resin, a polymerization initiator, a crosslinking agent, a coloring agent, and a gelling agent.

In particular, since the first preliminary composition and the second preliminary composition include the gelling agent, the first preliminary composition and the second preliminary composition may have a viscosity of 100,000 Pa to 5,000,000 Ps, and preferably a viscosity of 100,000 Ps to 2,500,000 Ps and may have a storage modulus of 100,000 Pa to 1,000,000 Pa, and preferably a storage modulus of 200,000 Pa to 600,000 Pa.

Since the composition for manufacturing the artificial marble including the first preliminary composition and the second preliminary composition has improved viscosity and/or storage modulus that is about 30 times to 100 times that of the existing composition in a slurry state, the composition for manufacturing the artificial marble is present in a semi-solid state at room temperature.

In this case, the viscosity of the second preliminary composition is higher than the viscosity of the first preliminary composition. In one embodiment, the viscosity of the second preliminary composition may be about 1,000 Ps to about 4,900,000 Ps, and preferably about 10,000 Ps to about 3,000,000 Ps as high as the viscosity of the first preliminary composition. Due to a viscosity difference between the first preliminary composition and the second preliminary composition, when marble is manufactured using the composition for manufacturing the artificial marble including the first preliminary composition and the second preliminary composition, a clear dashed pattern may be implemented.

Since the first preliminary composition and the second preliminary composition may include coloring agents having different colors, when the first preliminary composition and the second preliminary composition are extruded and mixed, a dashed pattern similar to that of natural marble may be obtained. For example, the first preliminary composition may use a coloring agent for implementing a base color of natural marble, and the second preliminary composition may use a coloring agent having a color for implementing a dashed pattern portion. The colors of the first preliminary composition and the second preliminary composition may be distinguished, thereby implementing a dashed pattern portion.

Since the first preliminary composition and the second preliminary composition have different resistance forces with respect to the same external pressure, the composition for manufacturing the artificial marble including the first and second preliminary compositions implements a dashed pattern through a process such as an extruding process, a pressing process, a milling process, or a rolling process.

The first preliminary composition and the second preliminary composition may be included in a weight ratio of 1:1 to 500:1 in the composition for manufacturing the artificial marble. A composition ratio of the first preliminary composition to the second preliminary composition is preferably in a range of 1:1 to 500:1, and more preferably, a range of 10:1 to 200:1.

The first preliminary composition and the second preliminary composition each include the acrylic-based monomer, the acrylic-based resin, the polymerization initiator, the crosslinking agent, the coloring agent, and the gelling agent.

The acrylic-based monomer may include one selected from the group consisting of (metha)acrylic acid ester, cyclohexyl(metha)acrylate, glycidyl(metha)acrylate, hydroxyalkyl(metha)acrylate, and benzyl(metha)acrylate, and a mixture of at least two thereof, which have $C_1$ to $C_{20}$ alkyl group. For example, the acrylic-based monomer may include one selected from the group consisting of methyl(metha)acrylate, ethyl(metha)acrylate, butyl(metha)acrylate, 2-ethylhexyl(metha)acrylate, benzyl(metha)acrylate, glycidyl(metha)acrylate, and a mixture of at least two of thereof. Preferably, the acrylic-based monomer may include methyl(metha)acrylate, but the present invention is not limited thereto.

A type of the acrylic-based resin is not particularly limited as long as the acrylic-based resin is a polymer or oligomer prepared using an acrylic monomer as a main component, and any acrylic-based resin generally used in the art may be used without limitation. For example, the acrylic-based resin may be a resin including at least one monomer selected from (metha)acrylate, ethyl(metha)acrylate, butyl(metha)acrylate, 2-ethylhexyl(metha)acrylate, benzyl(metha)acrylate, and glycidyl(metha)acrylate. For example, the acrylic-based resin may be an acrylic-based polymer. Preferably, the acrylic-based resin may be a polymethyl methacrylate (PMMA) resin having excellent weatherproof, mechanical strength, and surface gloss.

The gelling agent is added for the purpose of imparting viscoelasticity to the preliminary composition, improving workability, and smoothly performing processes such as mixing and molding processes. A type of the gelling agent is not particularly limited as long as the gelling agent meets the purpose. For example, the gelling agent may include an acrylic-based copolymer including at least one selected from the group consisting of methacrylate, methyl methacrylate, butyl acrylate, ethyl acrylate, and styrene. The methyl methacrylate serves to shorten a melting time, the butyl acrylate servers to improve process dispersibility, and the ethyl acrylate serves to improve oil resistance and heat resistance. Preferably, the gelling agent may be an acrylic-based copolymer including butyl acrylate, methacrylate, methyl methacrylate and/or styrene.

In this case, a molecular weight of the gelling agent to be added may be preferably in a range of 1,000,000 to 5,000,000, and more preferably in a range of 1,500,000 to 5,000,000. When the molecular weight of the gelling agent is less than the above range, a large amount of the gelling agent is required to increase viscoelasticity and hardness of the preliminary composition. When the molecular weight of the gelling agent exceeds the above range, many cell structures may be formed in artificial marble when the artificial marble is manufactured, resulting in reductions in characteristics and physical properties.

In addition, intrinsic viscosity (η) of the gelling agent may be preferably in a range of 1 to 13, and more preferably in a range of 3 to 13. When the intrinsic viscosity of the gelling agent is less than the above range, a large amount of the gelling agent is required to increase viscoelasticity and hardness of the preliminary composition. When the intrinsic viscosity of the gelling agent exceeds the above range, characteristics and physical properties of artificial marble may be reduced.

The polymerization initiator is a radical initiator that causes a curing reaction by heat at a temperature of about 100° C. or more. When a process such as a press-molding process is performed on the composition for manufacturing the artificial marble in which aging and/or semi-curing processes are completed, the component may perform a function of improving curing efficiency or the like. A type of the polymerization initiator is not particularly limited as long as the polymerization initiator may perform the above-described action and may have a 10 hour half-life temperature of 100° C. or more. For example, the polymerization initiator may include one selected from t-butyl perbenzoate, t-butyl perisopropyl carbonate, t-butylper-2-ethylhexanoate, 1,1-di-t-butylper-2,2,5-trimethylcyclohexane, and a mixture of at least two thereof.

As long as the crosslinking agent may form a crosslinking bond with the acrylic-based resin, a kind thereof is not particularly limited, and any crosslinking agent may be used. For example, the crosslinking agent may include one selected from the group consisting of ethylene glycol di(metha)acrylate, diethylene glycol di(metha)acrylate, triethylene glycol di(metha)acrylate, tetraethylene glycol di(metha)acrylate, trimethylol propane tri(metha)acrylate, 1,6-hexanediol di(metha)acrylate, polybutylene glycol di(metha)acrylate, neopentyl glycol di(metha)acrylate, and a mixture of at least two thereof.

In addition, as long as the coloring agent may be mixed together with a resin component to implement a natural and elegant exterior effect, a type thereof is not particularly limited, and any coloring agent may be used. Specific examples of the coloring agent may include one selected from the group consisting of a pigment, a dye, a resin chip, and a mixture of at least two thereof.

A type of the pigment or dye may adopt and use an organic or inorganic pigment or dye in the art without limitation according to a desired exterior effect. In addition, a specific type of the above-described chip is also not particularly limited and may adopt and use a general component in the art. Examples of the chip may include resin chips or natural material chips. The above-described resin chip may be prepared by manufacturing a flat plate or the like using a resin component such as an acrylic resin, an unsaturated polyester resin, an epoxy resin, or a melamine resin, and, then pulverizing the flat plate or the like into an appropriate size. When various pigments, dyes, or the like are mixed in such a process, a color chip may be prepared. In addition, examples of the above-described natural material chip may include one selected from mother-of-pearl, stone, a stone powder, quartz, a charcoal powder, red clay, a magnetic powder, flavoring, pearl, a mirror powder, and a mixture of at least twp thereof. However, a kind of a coloring agent such as a chip usable in the present invention is not limited to the above-described type and may be variously selected according to an exterior effect to be implemented.

The first preliminary composition and the second preliminary composition constituting the composition for manufacturing the artificial marble according to the present invention may further include at least one additive selected from the group consisting of an inorganic filler, a coupling agent, an internal release agent, a chain transfer agent, an antifoaming agent, a polymerization accelerator, an ultraviolet stabilizer, a polymerization inhibitor, and a contractor resistance in addition to the above-described components. It is preferable that the at least one additive is appropriately included in a range in which a content thereof does not affect physical properties of the preliminary composition.

The inorganic filler may serve to improve surface smoothness and increase hardness by preventing a contraction phenomenon during molding of the preliminary composition. Examples of the inorganic filler usable in the present invention may include at least one selected from the group consisting of aluminum hydroxide, magnesium hydroxide, calcium carbonate, silica, alumina, and calcium aluminate, but the present invention is not particularly limited thereto.

The coupling agent may be used as a surface treating agent of the inorganic filler such that the inorganic filler is chemically bonded to a resin component.

Each of the first preliminary composition and the second preliminary composition constituting the composition for manufacturing the artificial marble may include 10 to 40 parts by weight of a resin syrup solution obtained by dissolving 10 to 50 parts by weight of an acrylic-based resin in 50 to 90 parts by weight of an acrylic-based monomer, 0.01 to 1 part by weight of a polymerization initiator, 0.02 to 2 parts by weight of a crosslinking agent, and 3 to 20 parts by weight of a gelling agent. In addition, each of the first preliminary composition and the second preliminary composition may further include 60 to 90 parts by weight of an inorganic filler, 0.01 to 1 part by weight of a coupling agent, and 0.02 to 2 parts by weight of an internal release agent as needed.

A method of preparing the resin syrup solution is not particularly limited, and the resin syrup solution may be prepared by dissolving an appropriate high molecular weight material in a reactive monomer according to a typical method. Specifically, the resin syrup solution may be prepared by dissolving 10 to 50 parts by weight of an acrylic-based resin in 50 to 90 parts by weight of an acrylic-based monomer. In this case, when the acrylic-based monomer is included in an amount less than the above range with respect to the acrylic-based resin, viscosity of a resin syrup may be increased, and thus, a handling property may be lowered. When the acrylic-based monomer is included in an amount exceeding the above range, properties such as curing properties and contractility of the preliminary composition may be lowered.

In addition, in terms of improving heat resistance and chemical resistance of the resin syrup solution, the first preliminary composition and the second preliminary composition may include 0.02 to 2 parts by weight of a crosslinking agent with respect to 10 to 40 parts by weight of the resin syrup.

In the first preliminary composition and the second preliminary composition, necessary viscoelasticity and hardness may be adjusted by appropriately adjusting contents of the resin syrup solution in which acrylic-based resin is dissolved, the inorganic filler, and the gelling agent.

In this case, when the gelling agent is included in an amount less than 3 parts by weight, the preliminary composition has fluidity in a stationary state and thus is not easy to handle. When the gelling agent is included in an amount exceeding 20 parts by weight, the hardness and viscoelasticity are excessively increased, and thus, it is difficult to deform, machine, and knead the preliminary composition.

In addition, when the inorganic filler is included in an amount less than 60 parts by weight, hardness of the preliminary composition may be lowered. When the inorganic filler is included in an amount exceeding 90 parts by weight, the hardness may be higher than necessary to reduce moldability of the preliminary composition.

Preferably, the first preliminary composition and the second preliminary composition may include 10 to 30 parts by weight of a resin syrup solution obtained by dissolving 10 to 50 parts by weight of an acrylic-based resin in 50 to 90 parts by weight of an acrylic-based monomer, 0.05 to 0.05 parts by weight of a polymerization initiator, 0.05 to 1 part by weight of a crosslinking agent, and 3 to 15 parts by weight of a gelling agent. In addition, the first preliminary composition and the second preliminary composition may further include 60 to 80 parts by weight of an inorganic filler, 0.02 to 0.5 parts by weight of a coupling agent, and 0.05 to 1 part by weight of an internal release agent.

The first preliminary composition and the second preliminary composition may be represented by complex viscosity that is converted from the viscosity (absolute viscosity), and the complex viscosity is in a range of 10,000 Pa·s to 500,000 Pa·s.

A reference for converting the viscosity into the complex viscosity is represented by Expression below.

*1 Ps=0.1 Pa·s

In one embodiment, the first preliminary composition and the second preliminary composition may have a hardness of 5 HsC to 70 HsC and may present in a semi-solid state at room temperature.

The composition for manufacturing the artificial marble of the present invention is prepared through a method different from an existing method. In order to express a texture and pattern similar to those of natural marble, for example, a wave pattern, a spread pattern, and a granite pattern, in the past, a composition of artificial marble has been pressed and prepared using a method of scattering, syringe-ejecting, or spraying chips or changing a structure of a conveyor during a casting process, a method using large chips use, or a mixing method using a kneader.

In one embodiment, the composition for manufacturing the artificial marble of the present invention may be prepared by the following method. According to the following method, it is possible to mass-produce artificial marble on which a dashed pattern implemented.

As the above-described preliminary compositions, after the first and second preliminary compositions are prepared, when the compositions are weighed at an appropriate weight ratio and then are repeatedly and sequentially introduced into an extruder, the first and second preliminary compositions are mixed in an appropriate amount. Thus, a dashed pattern is implemented, and the first and second preliminary compositions are concurrently molded into a sheet form.

After a composition sheet for manufacturing artificial marble obtained by mixing the first and second preliminary compositions is placed in a press mold, the composition sheet is specific press-molded and cured at a specific temperature. Next, after the cured artificial marble is de-molded, post-treatment, such as cooling, polishing, or sanding may be performed, thereby obtaining artificial marble on which a dashed pattern implemented.

In the present invention, by using the composition for manufacturing artificial marble including the first and second preliminary compositions with high viscoelasticity in a semi-solid state, when the artificial marble is manufactured, an external force is applied through various processes such as extruding, milling, and roller processes, thereby freely implementing a desired pattern.

Next, the present invention will be described in more detail with reference to Examples, but the scope of the present invention is not limited to Examples below.

Preparation of Preliminary Composition for Manufacturing Artificial Marble

As preliminary compositions for manufacturing artificial marble according to the present invention, compositions of Preparation Examples 1 to 4, which are first and second preliminary compositions, were prepared.

Preparation Example 1

An acrylic resin syrup solution was prepared by dissolving 23 wt % of polymethyl methacrylate (IH-830B manufactured by LG Chem, Korea) as an acrylic-based resin in 77 wt % of methyl methacrylate as an acrylic-based monomer.

A liquid syrup was prepared by mixing 0.25 wt % of t-butyl peroxybenzoate (Trigonox C manufactured by Akzonobel, Netherlands) as a polymerization initiator, 0.5 wt % of ethylene glycol dimethacrylate as a crossing agent, and 0.25 wt % of mono(2-methacryloyl oxyethyl)acid phosphate as a coupling agent into 21 wt % of the prepared acrylic resin syrup solution.

Next, 73 wt % of aluminum hydroxide as an inorganic filler and 0.5 wt % of zinc stearate (SZ210 manufactured by Songwon Industrial Co., Korea) as an internal release agent were introduced into a kneader, and while the kneader was rotated at a low speed, the prepared liquid syrup was introduced into the kneader. After the prepared liquid syrup was introduced into the kneader, the liquid syrup was mixed in the kneader for 10 minutes to prepare artificial marble slurry. A pigment required for coloring was added in a process of preparing the slurry to allow the slurry to exhibit a color.

Finally, 4.5 wt % of a gelling agent including butyl acrylate, a methacrylic acid, methyl methacrylate, and styrene was added to the artificial marble slurry and mixed for 5 minutes to prepare high viscosity preliminary composition for manufacturing artificial marble, which has with viscoelasticity.

Preparation Example 2

A preliminary composition for manufacturing artificial marble was prepared in the same manner as in Preparation Example 1, except that contents of an acrylic resin syrup and an inorganic filler were changed in order to adjust physical properties of Preparation Example 1.

Preparation Example 3

A preliminary composition for manufacturing artificial marble was prepared in the same manner as in Preparation Example 1, except that contents of an acrylic resin syrup, an inorganic filler, and a gelling agent were changed in order to adjust physical properties of Preparation Example 1 (but, a pigment with a color distinct from that of Preparation Example 1 was added).

Preparation Example 4

A preliminary composition for manufacturing artificial marble was prepared in the same manner as in Preparation Example 1, except that contents of an acrylic resin syrup and an inorganic filler were changed in order to adjust physical properties of Preparation Example 3 (but, a pigment with the same color as that of Preparation Example 1 was added)

Comparative Preparation Example 1

A composition for manufacturing artificial marble conventionally used was prepared as Comparative Preparation Example. As in Preparation Example 1, an acrylic resin syrup, an inorganic filler, a polymerization initiator, a crosslinking agent, a coupling agent, an internal release agent were added in contents shown in Table 1 below and mixed in a kneader. Then, a preliminary composition for manufacturing artificial marble was prepared without adding a gelling agent (but, a pigment with the same color as that of Preparation Example 3 was added).

Components and contents of the preliminary compositions for manufacturing the artificial marble prepared in Preparation Examples 1 to 4 and Comparative Preparation Example 1 are summarized and shown in Table 1 below.

Experimental Example 1. Measurement of Viscoelasticity and Hardness

Viscoelasticity and hardness of the preliminary compositions prepared according to Preparation Examples and Comparative Preparation Example were measured and used as the first and second preliminary compositions of the present invention.

Specific measuring methods are as follows.

1-1. Measuring Method of Viscoelasticity

Viscoelasticity was measured under the following conditions using a rotational rheometer (DHR-1 manufactured by TA Instrument).

* Viscoelasticity Measurement Conditions according to Frequency Sweep (1) Frequency: 0.1 Hz to 100 Hz (2) Strain: 1%

(3) Temperature: 25±2° C.

(4) Minimum Torque Oscillation: 10 nN·m (5) Maximum Torque Oscillation: 150 mN·m (6) Torque Resolution: 0.1 nN·m (7) Measuring Geometry: 25 mm plate (8) Air Flow: Off 1-2. Measuring Method of Hardness Hardness was measured using an EX-asker durometer (JIS K 7312 C type).

Measurement results of the viscoelasticity and hardness measured through the methods are summarized and shown in Table 2 below.

TABLE 1

| Component (unit: wt %) | Preparation Example 1 | Preparation Example 2 | Preparation Example 3 | Preparation Example 4 | Comparative Preparation Example 1 |
|---|---|---|---|---|---|
| Acrylic resin syrup | 21 | 19 | 21 | 19 | 30 |
| Inorganic filler | 73 | 75 | 69 | 71 | 68.6 |
| Polymerization initiator | 0.25 | 0.25 | 0.25 | 0.25 | 0.2 |
| Coupling agent | 0.25 | 0.25 | 0.25 | 0.25 | 0.2 |
| Crosslinking agent | 0.5 | 0.5 | 0.5 | 0.5 | 0.5 |
| Internal release agent | 0.5 | 0.5 | 0.5 | 0.5 | 0.5 |
| Gelling agent | 4.5 | 4.5 | 8.5 | 8.5 | 0 |

TABLE 2

| Classification | Preparation Example 1 | Preparation Example 2 | Preparation Example 3 | Preparation Example 4 | Comparative Preparation Example 1 |
|---|---|---|---|---|---|
| Storage modulus G (1 Hz, 25 ± 2° C.) | 261,697 Pa | 283,442 Pa | 477,729 Pa | 514,176 Pa | 5,452 Pa |
| Complex viscosity η* (1 Hz, 25 ± 2° C.) | 32,114 Pa·s | 36,432 Pa·s | 93,883 Pa·s | 102,941 Pa·s | 1,083 Pa·s |
| Absolute viscosity | 321,140 Ps | 364,320 Ps | 938,830 Ps | 1,029,410 Ps | 10,830 Ps |
| Hardness (JIS K7312-type C) | HsC 19 | HsC 25 | HsC 44 | HsC 52 | Unmeasurable |

As can be seen in Table 2, in the case of Preparation Examples 1 to 4 of the present invention, storage modulus was about 40 times to about 90 times as high as that of Comparative Preparation Example 1, and viscosity was about 30 time to about 95 times as high as that of Comparative Preparation Example 1. In addition, the preliminary compositions for manufacturing the artificial marble according to Preparation Examples of the present invention had a measurable level of hardness, and the hardness was high in proportion to viscosity and storage modulus.

On the other hand, the preliminary composition for manufacturing the artificial marble according to Comparative Preparation Example 1 had viscosity and storage modulus that are significantly lower than those of Preparations Examples and thus was present in a liquid state in which hardness measurement itself is impossible.

Example and Comparative Example: Preparation of Composition for Manufacturing Artificial Marble Among the preliminary compositions for manufacturing the artificial marble prepared in Preparation Examples and Comparative Preparation Example, compositions of which a color is distinguished were used as first and second preliminary compositions to prepare a composition for manufacturing artificial marble.

Specifically, the preliminary compositions for manufacturing the artificial marble were mixed at the following ratio and extruded using a single screw extruder.

TABLE 3

| Composition for manufacturing artificial marble | Preliminary composition for manufacturing artificial marble | |
|---|---|---|
| | First preliminary composition (content) | Second preliminary composition (content) |
| Example 1 | Preparation Example 1 (98 wt %) | Preparation Example 3 (2 wt %) |
| Example 2 | Preparation Example 2 (98 wt %) | Preparation Example 4 (2 wt %) |
| Comparative Example 1 | Preparation Example 1 (98 wt %) | Preparation Example 1 (2 wt %) |

Experimental Example 2: Manufacture of Artificial Marble

The prepared compositions for manufacturing the artificial marble of Examples and Comparative Example were divided into 5 parts and then were sequentially introduced into an extruder to prepare a sheet. Subsequently, a composition in a form of the sheet was placed in a press mold and then was cured by pressing the composition at a temperature of 130° C. and a pressure of 20 kg/cm' for 15 minutes.

Next, after the artificial marble cured in the press mold was de-molded, and post-treatment, such as cooling, polishing, or sanding was performed thereon, thereby manufacturing artificial marble having a dashed pattern.

FIGS. 1 to 3 show surfaces of artificial marbles manufactured using the compositions for manufacturing the artificial marble of Examples 1 and 2 and Comparative Example 1, respectively.

Referring to FIGS. 1 and 2, when artificial marble was manufactured using the compositions of Examples 1 and 2, it could be seen that artificial marble having a dashed pattern, which is similar to that of natural marble and is clear, was manufactured.

Referring to FIG. 3, when artificial marble was manufactured using the composition of Comparative Example 1, it could be seen that a dashed pattern was not implemented. This is because due to use of the preliminary composition having low viscosity and/or storage modulus of Comparative Preparation Example, the preliminary composition is easily mixed with the first preliminary composition.

That is, such a result shows that, when viscosity and/or storage modulus of the preliminary composition for manufacturing the artificial marble is in a range lower than a range of viscosity and/or storage modulus of the present invention, the preliminary composition for manufacturing the artificial marble is not appropriate for manufacturing artificial marble.

While exemplary embodiments of the present invention have been particularly shown and described, it will be understood by those of ordinary skill in the art that various changes in form and details may be made therein without departing from the spirit and scope of the present invention as defined by the following claims.

INDUSTRIAL APPLICABILITY

Since a composition for manufacturing artificial marble of the present invention includes a preliminary composition having a high viscoelasticity in a semi-solid state, the composition for manufacturing the artificial marble is easier to handle as compared with most existing compositions for manufacturing artificial marble, which are prepared in a liquid state. Accordingly, the composition for manufacturing the artificial marble has excellent workability and machinability.

A composition for manufacturing artificial marble of the present invention can be applied to various molding and machining methods, can express a texture similar to that of natural marble, and in particular, can implement a dashed pattern.

The invention claimed is:

1. A composition for manufacturing artificial marble, the composition comprising:
   a first preliminary composition; and
   a second preliminary composition,
   wherein each of the first and second preliminary compositions comprises:
   an acrylic-based monomer;
   an acrylic-based resin;
   a polymerization initiator;
   a crosslinking agent;
   a coloring agent; and
   a gelling agent that is an acrylic-based copolymer including two or more monomers selected from the group consisting of: methacrylate, methyl methacrylate, butyl acrylate, ethyl arylate, styrene, and combinations thereof,
   wherein the coloring agent of the first preliminary composition and the coloring agent of the second preliminary composition have different colors,
   wherein the first preliminary composition has a first viscosity of 100,000 Ps to 5,000,000 Ps and/or a first storage modulus of 100,000 Pa to 1,000,000 Pa, and
   wherein the second preliminary composition has a second viscosity that is greater than the first viscosity of the first preliminary composition.

2. The composition of claim 1, wherein a weight ratio of the first preliminary composition to the second preliminary composition is in a range of 1:1 to 500:1.

3. The composition of claim 1, wherein the viscosity of the second preliminary composition ranges from 1,000 Ps to 4,900,000 Ps.

4. The composition of claim 1, wherein the composition further comprises a third preliminary composition, wherein the third preliminary composition differs from the first preliminary composition and the second preliminary composition.

5. The composition of claim 4, wherein the third preliminary composition differs from the first preliminary composition and the second preliminary composition in any one of the viscosity and the coloring agent.

6. The composition of claim 1, wherein the acrylic-based monomer of at least one of the first preliminary composition and the second preliminary composition is selected from the group consisting of methyl(metha)acrylate, ethyl(metha)acrylate, butyl(metha)acrylate, 2-ethylhexyl(metha)acrylate, benzyl(metha)acrylate, glycidyl(metha)acrylate, and combinations thereof.

7. The composition of claim 1, wherein the acrylic-based resin of at least one of the first preliminary composition and the second preliminary composition is polymethyl methacrylate.

8. The composition of claim 1, wherein the gelling agent of at least one of the first preliminary composition and the second preliminary composition has an intrinsic viscosity ($\eta$) of 1 to 13.

9. The composition of claim 1, wherein the polymerization initiator of at least one of the first preliminary composition and the second preliminary composition is selected from the group consisting of: t-butyl perbenzoate, t-butyl peroxybenzoate, t-butyl perisopropyl carbonate, t-butylper-2-ethylhexanoate, 1,1-di-t-butylper-2,2,5-trimethylcyclohexane, and combinations thereof.

10. The composition of claim 1, wherein the crosslinking agent of at least one of the first preliminary composition and the second preliminary composition is selected from the group consisting of: ethylene glycol di(metha)acrylate, diethylene glycol di(metha)acrylate, triethylene glycol di(metha)acrylate, tetraethylene glycol di(metha)acrylate, trimethylol propane tri(metha)acrylate, 1,6-hexanediol di(metha)acrylate, polybutylene glycol di(metha)acrylate, neopentyl glycol di(metha)acrylate, and combinations thereof.

11. The composition of claim 1, wherein at least one of the first preliminary composition and the second preliminary composition further comprises an additive selected from the group consisting of: an inorganic filler, a coupling agent, an internal release agent, a chain transfer agent, an antifoaming agent, a polymerization accelerator, an ultraviolet stabilizer, a polymerization inhibitor, a contraction resistor, and combinations thereof.

12. The composition of claim 11, wherein the inorganic filler is selected from the group consisting of: aluminum hydroxide, magnesium hydroxide, calcium carbonate, silica, alumina, calcium aluminate, and combinations thereof.

13. The composition of claim 1, wherein each of the first preliminary composition and the second preliminary composition includes 10 to 40 parts by weight of a resin syrup solution obtained by dissolving 10 to 50 parts by weight of the acrylic-based resin in 50 to 90 parts by weight of the acrylic-based monomer, 0.01 to 1 part by weight of the polymerization initiator, 0.02 to 2 parts by weight of the crosslinking agent, and 3 to 20 parts by weight of the gelling agent.

14. The composition of claim 13, wherein each of the first preliminary composition and the second preliminary composition further includes 60 to 90 parts by weight of an inorganic filler, 0.01 to 1 part by weight of a coupling agent, and/or 0.02 to 2 parts by weight of an internal release agent.

15. The composition of claim 1, wherein each of the first preliminary composition and the second preliminary composition has a complex viscosity of 10,000 Pa·s to 500,000 Pa·s.

16. The composition of claim 1, wherein each of the first preliminary composition and the second preliminary composition has a hardness of 5 HsC to 70 HsC.

17. The composition of claim 1, wherein the first preliminary composition and the second preliminary composition are in a semi-solid state.

18. An artificial marble manufactured using the composition for manufacturing artificial marble according to claim 1.

* * * * *